(12) United States Patent
Maric et al.

(10) Patent No.: US 12,525,155 B2
(45) Date of Patent: Jan. 13, 2026

(54) LIGHT OUTPUT

(71) Applicant: Apple Inc., Cupertino, CA (US)

(72) Inventors: Ivan S. Maric, San Francisco, CA (US); Darshan R. Kasar, San Francisco, CA (US); Junhan Ren, San Diego, CA (US); Paul X. Wang, Cupertino, CA (US); Forrest C. Wang, Petaluma, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/691,431

(22) PCT Filed: Sep. 15, 2022

(86) PCT No.: PCT/US2022/043714
§ 371 (c)(1),
(2) Date: Mar. 12, 2024

(87) PCT Pub. No.: WO2023/049020
PCT Pub. Date: Mar. 30, 2023

(65) Prior Publication Data
US 2024/0412669 A1 Dec. 12, 2024

Related U.S. Application Data

(60) Provisional application No. 63/247,204, filed on Sep. 22, 2021.

(51) Int. Cl.
*G09G 3/00* (2006.01)
*G06F 1/16* (2006.01)
*G09G 3/32* (2016.01)

(52) U.S. Cl.
CPC ............ *G09G 3/001* (2013.01); *G06F 1/163* (2013.01); *G06F 1/1686* (2013.01); *G09G 3/32* (2013.01)

(58) Field of Classification Search
CPC ........ G02B 2027/0118; G02B 27/0172; G09G 3/001; G09G 3/32; G06F 1/163; G06F 1/1686
See application file for complete search history.

(56) References Cited

U.S. PATENT DOCUMENTS 9,681,096 B1 6/2017 Motta et al.
9,936,194 B2 4/2018 Stein
(Continued)

FOREIGN PATENT DOCUMENTS

WO WO 2008/046075 4/2008

OTHER PUBLICATIONS

Invitation to Pay Additional Fees from PCT/US2022/045714, dated Feb. 8, 2023, 9 pages.
(Continued)

*Primary Examiner* — Insa Sadio
(74) *Attorney, Agent, or Firm* — BAKERHOSTETLER

(57) ABSTRACT

A wearable electronic device can include optical assemblies for providing visual output to a user. The optical assemblies can include a central display as well as a light track that surrounds at least a portion of the central display. Primary information and images can be provided at the central display to be received at a center region of a user's vision. Supplemental content and/or information can be provided by operation of the light track, which can be operated with relatively simple controls. The supplemental content and/or information can be received at a peripheral region of the user's vision. Accordingly, the inner and outer images produced by the separate mechanisms of the optical assembly can provide a single continuous image for observation by the user.

20 Claims, 7 Drawing Sheets

(56) References Cited

U.S. PATENT DOCUMENTS

| | | |
|---|---|---|
| 9,961,332 B2 | 5/2018 | Passmore et al. |
| 2016/0235323 A1 | 8/2016 | Tadi et al. |
| 2018/0167707 A1* | 6/2018 | Osterhout .......... G02B 27/0093 |
| 2020/0225482 A1* | 7/2020 | Bodiya .............. G02B 27/0172 |
| 2020/0310119 A1 | 10/2020 | Lee et al. |

OTHER PUBLICATIONS

International Search Report and Written Opinion from PCT/US2022/045714, dated Mar. 30, 2023, 14 pages.

\* cited by examiner

LIGHT OUTPUT

CROSS-REFERENCE TO RELATED APPLICATION

This application claims the benefit of U.S. Provisional Application No. 63/247,204, entitled "HEAD-MOUNTABLE DEVICE WITH LIGHT OUTPUT," filed Sep. 22, 2021, the entirety of which is incorporated herein by reference.

TECHNICAL FIELD

The present description relates generally to head-mountable devices, and, more particularly, to head-mountable devices with light output.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
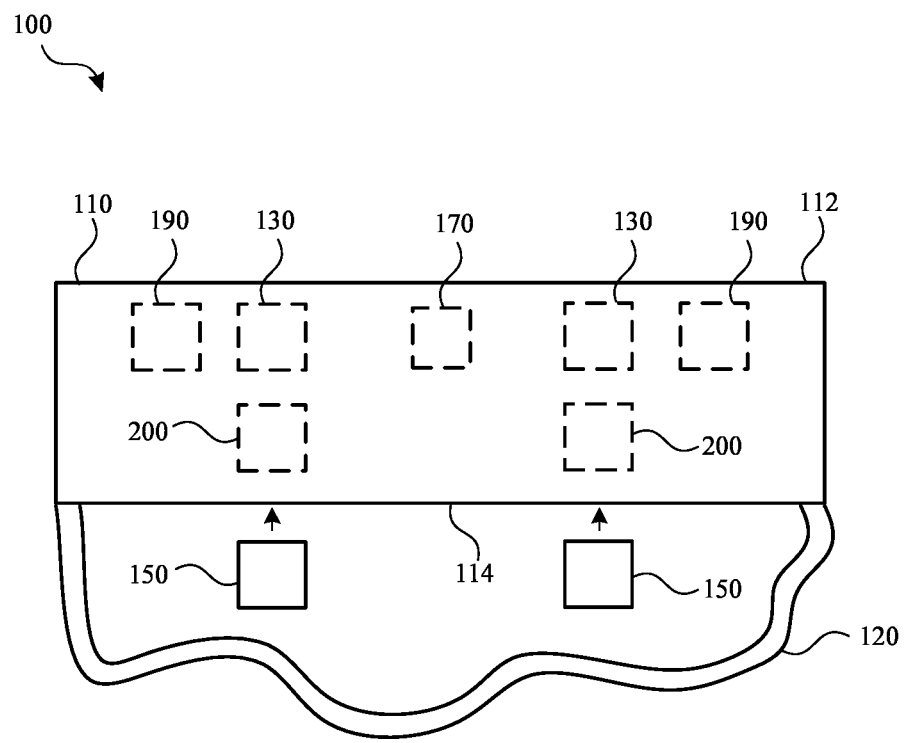
FIG. 1 illustrates a top view of a head-mountable device, according to some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mountable displays, headsets, visors, smartglasses, head-up display, etc., can perform a range of functions that are managed by the components (e.g., sensors, circuitry, and other hardware) included with the wearable device.

One of the primary outputs that can be provided to a user with a head-mountable device is visual output, including images, videos, views, renderings, and the like. One or more displays of a head-mountable device can provide such visual output to a user for observation. An application and/or operating system of the head-mountable device may often operate in entirety of the display to provide content and/or other related outputs. For the head-mountable device to alert or notify the user of content and/or information that is not related to the operation of such an application, the operating system of some head-mountable devices would render content to be overlaid with the visual output related to the application. Accordingly, the head-mountable device would simultaneously need to manage the output of the application with another type of content to be output on the same display. Such an operation presents a computational challenge for head-mountable devices, which will in turn impact the responsiveness, battery life, and temperature of the head-mountable device throughout its operation. Additionally, by rendering content on top of the displayed output of an application, the user's experience with that application is directly interrupted and/or otherwise impacted.

It can be desirable to provide a visual output that is separate from a central display of an optical assembly in a head-mountable device. Such an output can be operated independently of the central display, so that the operation of the central display deed not be modified when supplemental information and/or content is desired to be displayed. Despite being separate from a central display, it can be desirable to provide such supplemental content and/or information in a manner that presents a single continuous image for observation by the user.

Embodiments of the present disclosure provide a head-mountable device with optical assemblies for providing visual output to a user. The optical assemblies can include a central display as well as a light track that surrounds at least a portion of the central display. Primary information and images can be provided at the central display to be received at a center region of a user's vision. Supplemental content and/or information can be provided by operation of the light track, which can be operated with relatively simple controls. The supplemental content and/or information can be received at a peripheral region of the user's vision. Accordingly, the inner and outer images produced by the separate mechanisms of the optical assembly can provide a single continuous image for observation by the user.

These and other embodiments are discussed below with reference to FIGS. 1-10. However, those skilled in the art will readily appreciate that the detailed description given herein with respect to these Figures is for explanatory purposes only and should not be construed as limiting.

According to some embodiments, for example as shown in FIG. 1, a head-mountable device 100 includes a frame 110 that is worn on a head of a user. The frame 110 can be positioned in front of the eyes of a user to provide information within a field of view of the user. The frame 110 can provide nose pads or another feature to rest on a user's nose and/or engage other parts of the user's face.

The frame 110 can be supported on a user's head with the head engager 120. The head engager 120 can wrap or extend along opposing sides of a user's head. The head engager 120 can optionally include earpieces for wrapping around or otherwise engaging or resting on a user's ears. It will be appreciated that other configurations can be applied for securing the head-mountable device 100 to a user's head. For example, one or more bands, straps, belts, caps, hats, or other components can be used in addition to or in place of the illustrated components of the head-mountable device 100. By further example, the head engager 120 can include multiple components to engage a user's head.

The frame 110 can provide structure around a peripheral region thereof to support any internal components of the head-mountable device 100 in their assembled position. For example, the frame 110 can enclose and support various internal components (including for example integrated circuit chips, processors, memory devices and other circuitry) to provide computing and functional operations for the head-mountable device 100, as discussed further herein. While several components are shown within the frame 110, it will be understood that some or all of these components can be located anywhere within or on the head-mountable device 100. For example, one or more of these components can be positioned within the head engager 120 of the head-mountable device 100.

The frame 110 can include and/or support one or more cameras 130. The cameras 130 can be positioned on or near an outer side 112 of the frame 110 to capture images of views external to the head-mountable device 100. As used herein, an outer side of a portion of a head-mountable device is a side that faces away from the user and/or towards an external environment. The captured images can be used for display to the user or stored for any other purpose. Each of the cameras 130 can be movable along the outer side 112. For example, a track or other guide can be provided for facilitating movement of the camera 130 therein.

The frame 110 can include and/or support one or more other environment sensors 190 for detecting a condition and/or object relating to an environment external to the head-mountable device 100. For example, the environment sensors 190 can perform object recognition with a proximity sensor, a depth sensor, and/or another camera of the head-mountable device 100.

The head-mountable device 100 can include optical assemblies 200 that provide visual output for viewing by a user wearing the head-mountable device 100. One or more optical assemblies 200 can be positioned on or near an inner side 114 of the frame 110. As used herein, an inner side 114 of a portion of a head-mountable device is a side that faces toward the user and/or away from the external environment.

An optical assembly 200 can transmit light from a physical environment (e.g., as captured by a camera) for viewing by the user. Such an optical assembly 200 can include optical properties, such as lenses for vision correction based on incoming light from the physical environment. Additionally or alternatively, an optical assembly 200 can provide information with a display within a field of view of the user. Such information can be provided to the exclusion of a view of a physical environment or in addition to (e.g., overlaid with) a physical environment.

A physical environment refers to a physical world that people can interact with and/or sense without necessarily requiring the aid of an electronic device. A computer-generated reality environment relates to a partially or wholly simulated environment that people sense and/or interact with the assistance of an electronic device. Examples of computer-generated reality include, but are not limited to, mixed reality and virtual reality. Examples of mixed realities can include augmented reality and augmented virtuality. Examples of electronic devices that enable a person to sense and/or interact with various computer-generated reality environments include head-mountable devices, projection-based devices, heads-up displays (HUDs), vehicle windshields having integrated display capability, windows having integrated display capability, displays formed as lenses designed to be placed on a person's eyes (e.g., similar to contact lenses), headphones/earphones, speaker arrays, input devices (e.g., wearable or handheld controllers with or without haptic feedback), smartphones, tablets, and desktop/laptop computers. A head-mountable device can have an integrated opaque display, have a transparent or translucent display, or be configured to accept an external opaque display from another device (e.g., smartphone).

Referring again to FIG. 1, the head-mountable device can include one or more lens assemblies 150. The lens assembly 150 can be or include one or more lenses for providing corrective vision capabilities. It will be understood that, where multiple lenses are used, the lenses of the lens assembly 150 can be provided together or separately (e.g., for combination). One lens assembly 150 can be applied to each of multiple (e.g., two) optical assemblies 200, as described further herein.

Figure 2:
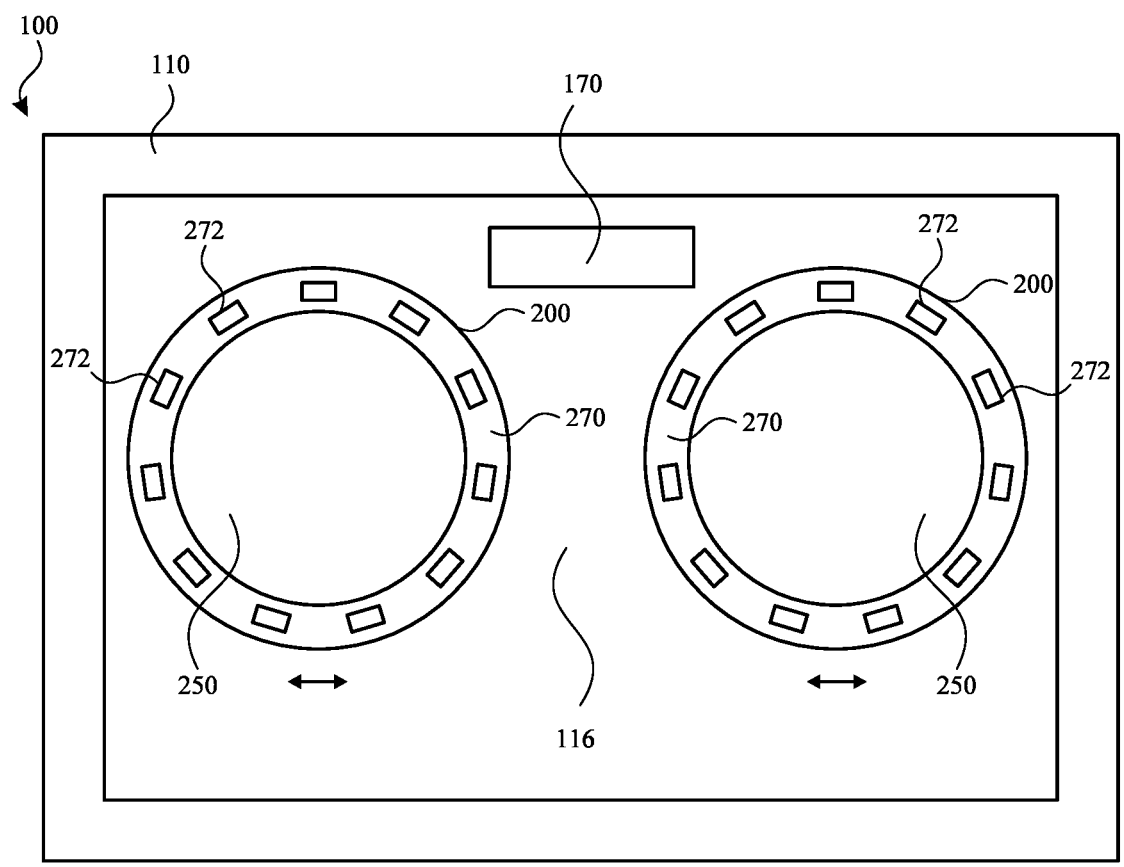
FIG. 2 illustrates a rear view of the head-mountable device of FIG. 1, according to some embodiments of the present disclosure.

Referring now to FIG. 2, the optical assemblies of the head-mountable device can be adjustable to accommodate the facial features of the user wearing the head-mountable device and align each optical assembly with a corresponding eye of the user. Additionally, the optical assemblies can have multiple output types to provide different outputs within a single, continuous field of view of the user.

As shown in FIG. 2, each optical assembly 200 can include a display 250 and a light track 270. The light track 270 can extend about a periphery of the display 250, such that the display 250 occupies a central region of the optical assembly 200. The light track 270 can have a number of light emitters 272 that are individually operable to output light with a controllable color, intensity, and/or activity, as described further herein. In some embodiments, the light emitters 272 can extend to and/or be positioned on a curtain 116 that is coupled to one or both of the optical assemblies 200. For example, the light emitters 272 can be positioned on the curtain 116 to maintain a position near the displays 250 without being movably mounted to the optical assemblies 200. In some embodiments, one or more of the light emitters 272 is mounted to the frame 110 to maintain a position on the head-mountable device without being movably mounted to the optical assemblies 200.

As further shown in FIG. 2, the head-mountable device 100 can include one or more user sensors 170. The user sensor 170 can be positioned and arranged to detect a characteristic of the user, such as facial features. For example, such a user sensor can perform facial feature detection, facial movement detection, facial recognition, eye tracking, user mood detection, user emotion detection, voice detection, and the like. While only one user sensor 170 is depicted in FIG. 2, it will be understood that any number of user sensors 170 can be provided. For example, a user sensor 170 can be coupled to, included with, or part of an optical assembly 200. Accordingly, such a user sensor 170 can move with the optical assembly 200 and be operated to detect the presence or absence of an eye (e.g., pupil, etc.) of a user, as well as the position and/or orientation thereof with respect to the head-mountable device 100. Such detections can further be used to determine whether the display 250 is in an optimal position and/or orientation with respect to the eye of the user and/or whether adjustments to the optical assembly 200 would be appropriate.

Each optical assembly 200 can be adjusted to align with a corresponding eye of the user. For example, each optical assembly 200 can be moved along and/or about one or more axes until a center of each optical assembly 200 is aligned with a center of the corresponding eye. Accordingly, the distance between the optical assemblies 200 can be set based on an interpupillary distance ("IPD") of the user. IPD is defined as the distance between the centers of the pupils of a user's eyes. While translational movement is depicted in FIG. 2, it will be further understood that rotational movement can, additionally or alternatively, be facilitated with respect to the frame 110.

The pair of optical assemblies 200 can be mounted to the frame 110 and separated by a distance. The distance between the pair of optical assemblies 200 can be designed to correspond to the IPD of a user. The distance can be adjustable to account for different IPDs of different users that may wear the head-mountable device 100. For example, either or both of the optical assemblies 200 may be movably mounted to the frame 110 to permit the optical assemblies 200 to move or translate laterally to make the distance larger or smaller. Any type of manual or automatic mechanism may be used to permit the distance between the optical assemblies 200 to be an adjustable distance. For example, the optical assemblies 200 can be mounted to the frame 110 via slidable tracks or guides that permit manual or electronically actuated movement of one or more of the optical assemblies 200 to adjust the distance there between. One or more motors can be operated to effect movement of the optical assembly 200 with respect to the frame 110. The motors can operate independently to move each of the optical assemblies 200. Additionally or alternatively, a single motor can be operated to simultaneously move each of the optical assemblies 200, for example with opposite but symmetrical movement.

Additionally or alternatively, the optical assemblies 200 can each be moved to a target location based on a desired visual effect that corresponds to user's perception of the optical assembly 200 when it is positioned at the target location. The target location can be determined based on a focal length of the user and/or optical elements of the system. For example, the user's eye and/or optical elements of the system can determine how the visual output of the optical assembly 200 will be perceived by the user. The distance between the optical assembly 200 and the user's eye and/or the distance between the optical assembly 200 and one or more optical elements can be altered to place the optical assembly 200 at, within, or outside of a corresponding focal distance. Such adjustments can be useful to accommodate a particular user's eye, corrective lenses, and/or a desired optical effect.

Figure 3:
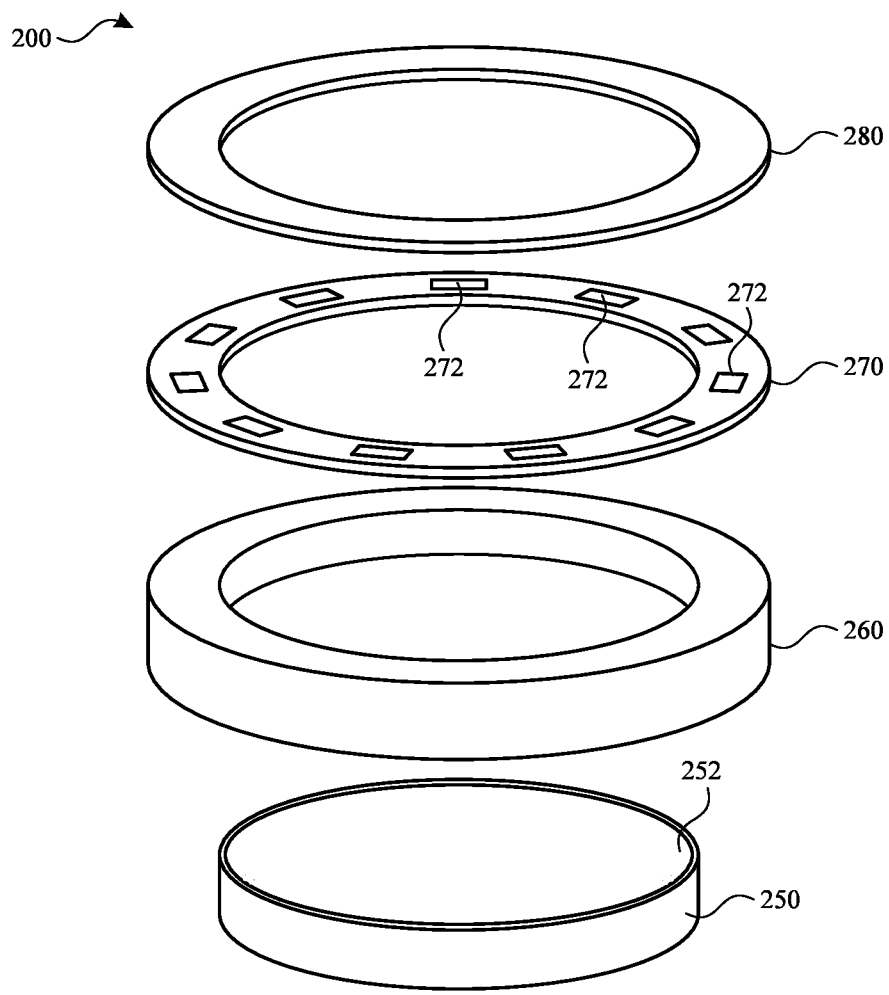
FIG. 3 illustrates a perspective exploded view of an optical assembly of the head-mountable device of FIGS. 1 and 2, according to some embodiments of the present disclosure.
Figure 4:
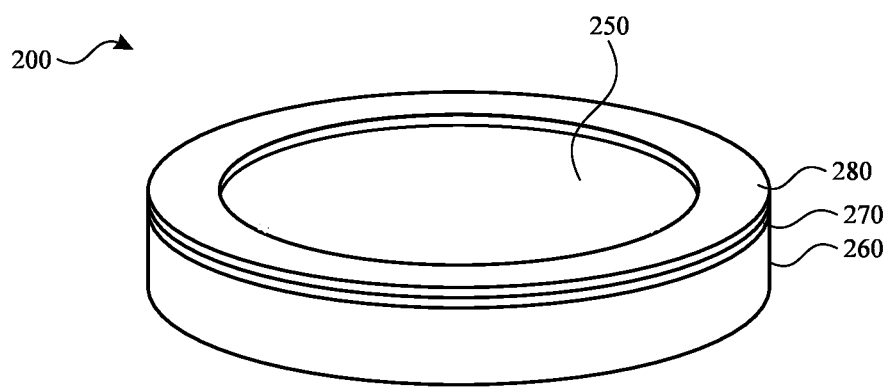
FIG. 4 illustrates a perspective view of the optical assembly of FIG. 3, according to some embodiments of the present disclosure.
Figure 5:
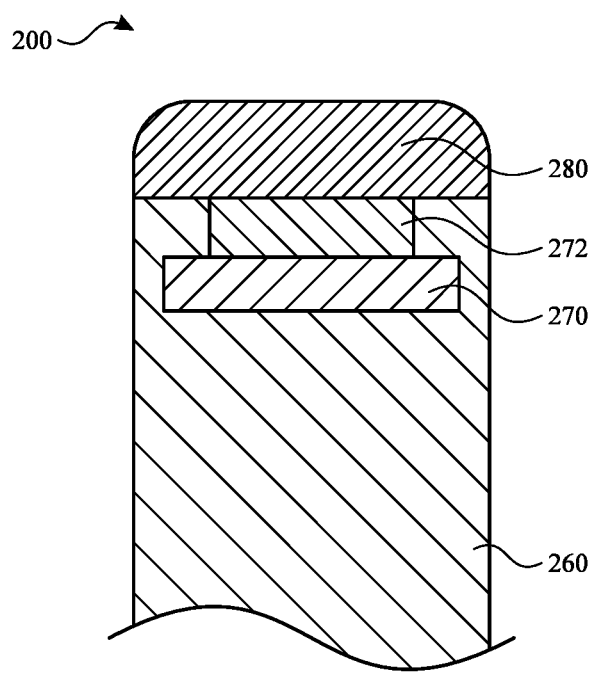
FIG. 5 illustrates a sectional view of a portion of the optical assembly of FIG. 4, according to some embodiments of the present disclosure.

Referring now to FIGS. 3-5, each optical assembly can be formed by an assembly of parts to provide various types of light outputs that provide a single continuous image. As shown in FIGS. 3 and 4, the optical assembly 200 can include a display 250. The display 250 can include a screen 252 that outputs visual information. The display 250 may utilize one or more of a variety of technologies to provide visual output. For example, the display 250 can include, without limitation, OLEDs, LEDs, uLEDs, liquid crystal on silicon, laser scanning light source, or any combination of these technologies. The display 250 can include an array of pixels that are individually operable to provide light of a particular color and/or intensity at any given moment.

As further shown in FIGS. 3 and 4, the optical assembly 200 can further include a light track 270 having light emitters 272 provided thereon. The light track 270 can extend circumferentially to surround the display 250 and/or an optical pathway of the visual output from the display 250. For example, the display 250 can output light that is directed through the light track 270. The light emitters 272 of the light track 270 can likewise output light in a direction that is generally parallel to the light output from the display 250. As such, the output of the display 250 can be provided at a central region of the continuous image that is output by the optical assembly 200, and the output of the light track 270 can be provided at a peripheral region of the continuous image that is output by the optical assembly 200.

It will be understood that a user wearing the head-mountable device and observing the optical assembly 200 can focus a center of their gaze on the display 250 with the user's foveal or central vision and also observe light from the light track 270 with the user's peripheral vision. For example, the display 250 can provide an output that corresponds to a view captured by a camera of the head-mountable device or another CGR environment, and the user can focus on the output of the display 250 to observe (e.g., with the fovea centralis) the details of the portion of the image provided by the display 250. By further example, the light track 270 can also provide an output; however, the output of the light track 270 can be directed to the user's peripheral vision (e.g., with the parafovea). As such, the output of the light track 270 need not be as detailed as the output of the display 250, as the parafovea is less capable of capturing details as is the fovea centralis.

Accordingly, the light track 270 can have a variety of differences with respect to the display 250. For example, whereas the display 250 can have a number of pixels and a corresponding pixel density, the light track 270 can have a number of light emitters 272 that each operate as a pixel. The distribution of the light emitters 272 can produce a pixel density that is lower than a pixel density of the display 250. By further example, the light emitters 272 can be provided with corresponding dimensions, such as a width of each. While the light emitters 272 can each have a corresponding width, the distance between an adjacent pair of the light emitters 272 can be greater than a width of either one of the light emitters 272. It will be understood that the number of light emitters 272 illustrated in the figures is merely an example, and that any number of light emitters 272 can be provided along the light track 270. The light emitters 272 can be generally evenly distributed or unevenly distributed about the perimeter defined by the light track 270. It will be understood that, while the light emitters 272 are distributed a distance away from each other and or the display 250, the image output provided by the optical assembly 200 can appear as a single continuous image to the user observing the optical assembly.

The light emitters 272 of the light track 270 can be individually operable to output a given color and/or intensity at any given time. Sample, each light emitter 272 can be or include a light emitting diode (LED), such as an RGB (red, green, blue) LED that can output a given color within the visible spectrum and/or combination of colors at any given time. While the display 250 can provide a view captured by a camera and/or other visual information, such as a CGR environment, the light emitters 272 can be separately operable, such that the information provided thereby need not be rendered by the display 250 (e.g., as a modification and/or overlay of the output provided by the display 250). Accordingly, the processing power required to operate the light emitters 272 can be highly efficient as compared to the processing power of further modifying a detailed output of, for example, the display 250. Additionally, the drivers and/or other controls for the light emitters 272 can be separate from the driver and/or other controls for the display 250. As such, the light emitters 272 can be operated as a subsystem that need not coordinate its output with the display 250. Alternatively, the light emitters 272 can be operated in a manner that is coordinated with the output of the display 250. Whether or not the outputs are coordinated, the outputs can form a single continuous image for observation by the user.

As further shown in FIGS. 3 and 4, the optical assembly 200 can further include a diffuser 280 that interacts with the light emitted by the light track 270 and/or the light emitters 272 thereof. For example, the diffuser 280 can scatter the light so that the light emitters 272, while separated by distances there between, can output light through the diffuser 280 that appears continuous. Such an effect can allow the light to be provided in zones broader than the width of the light emitters 272. The diffuser 280 can be positioned such that light emitted by the light emitters 272 of the light track 270 passes through the diffuser 280 to arrive at the eyes of the user. The diffuser 280 can include a light scattering material and/or particles within a medium or carrier such as a glass enclosure. The diffuser 280 can serve to scatter or re-direct at least some of the light emitted by the light track 270 to provide a desired emission profile. The properties of the diffuser 280, such as geometry, scattering properties, surface roughness or smoothness, and spatial distribution of scattering particles may be used to control various optical properties such as color uniformity and light intensity distribution as a function of viewing angle. The diffuser 280 can further comprise an optical element that at least partially encloses the light track 270 and/or the light emitters 272 thereof.

As further shown in FIGS. 3 and 4, the optical assembly 200 can further include a barrel 260 to provide support for other components of the optical assembly 200. For example, the barrel 260 can surround an outer periphery of the display 250 and/or an output portion thereof and provide support thereto. Additionally, the optical enclosure 202 can define at least a portion of a periphery of the optical assembly 200. The barrel 260 can provide a view to the display 250. The diffuser 280 and/or the light track 270 can be on a side of the barrel 260 that can face at least partly towards the eye of the user, such that, as viewed by the user, the diffuser 280 and/or the light track 270 are adjacent to (e.g., surrounding) the display 250.

FIG. 5 illustrates a sectional view of a portion of the optical assembly of FIGS. 3 and 4. As shown in FIG. 5, the barrel 260 of the optical assembly 200 can support the light track 270, including light emitters 272 thereof, and the diffuser 280. The light track 270 can be positioned between the barrel 260 and the diffuser 280, for example within a recess of the barrel 260. The diffuser 280 can be coupled to the barrel 260 to enclose the light track 270. The light emitters 272 of the light track can be positioned to direct light through the diffuser 280. While only a portion of the optical assembly 200 is shown in FIG. 5, it will be understood that the illustrated assembly can extend annularly about a display (not shown).

Figure 6:
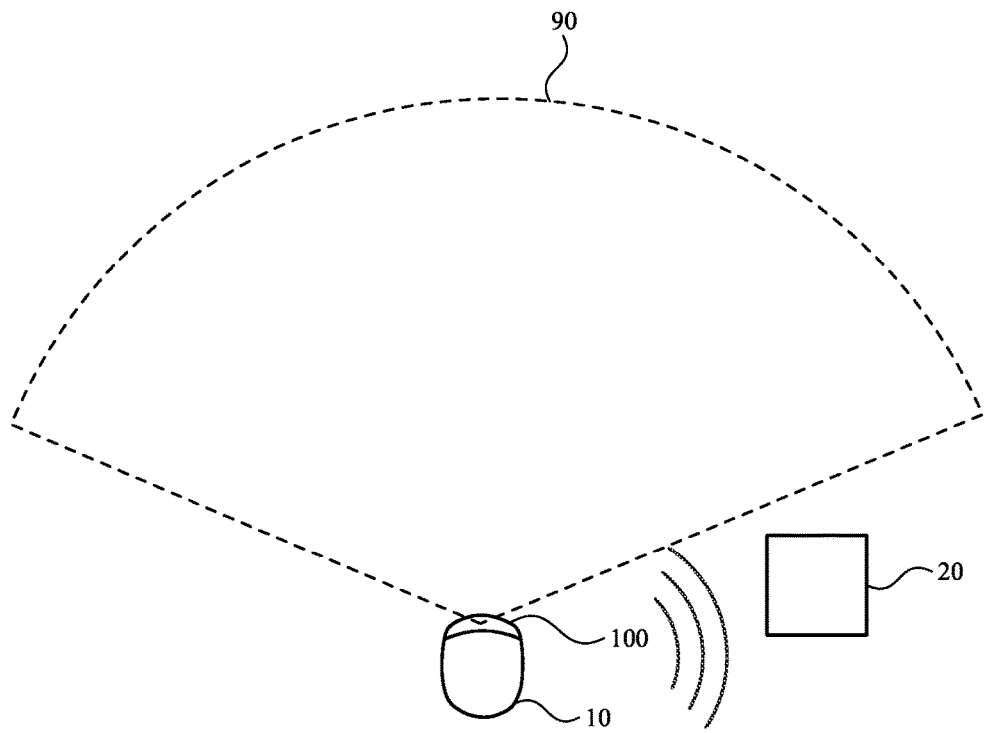
FIG. 6 illustrates a top view of a head-mountable device in use by a user, according to some embodiments of the present disclosure.
Figure 7:
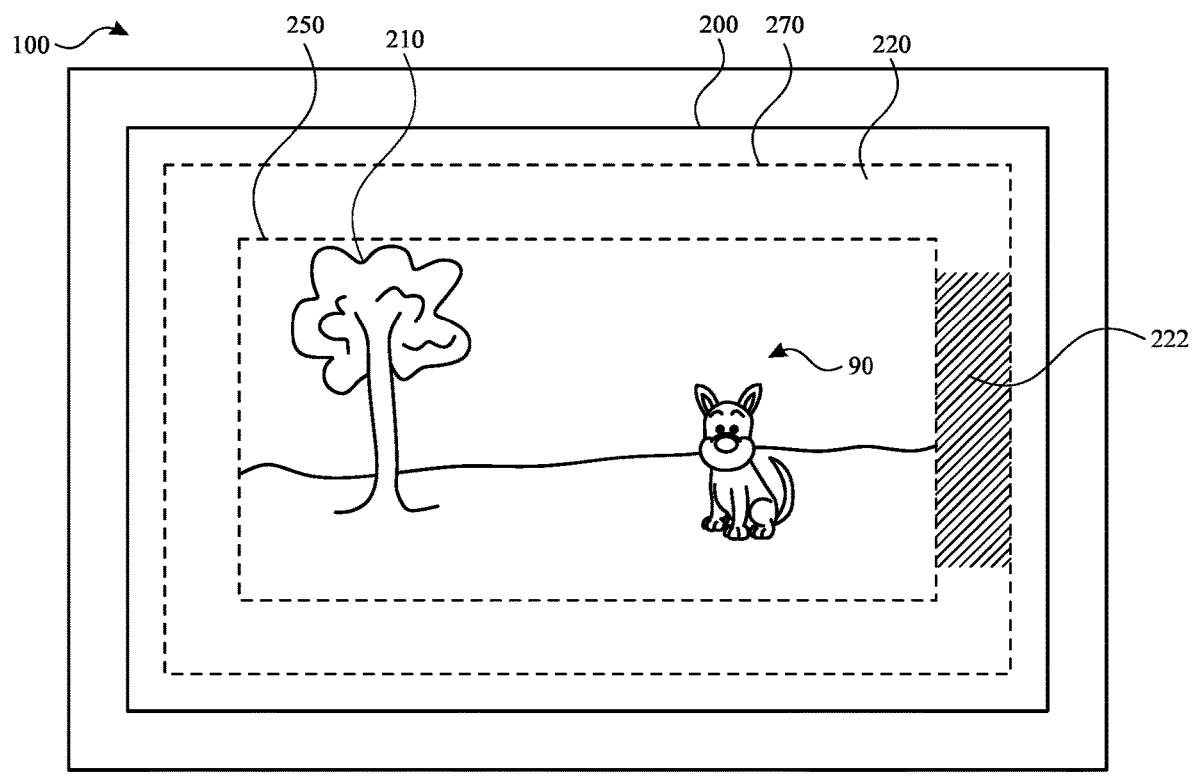
FIG. 7 illustrates a view of a head-mountable device providing a user interface with an optical assembly, according to some embodiments of the present disclosure.

Referring now to FIGS. 6 and 7, a user can wear and/or operate a head-mountable device that provides outputs to facilitate awareness of the environment. As shown in FIG. 6, a user 10 can wear the head-mountable device 100, which provides a field of view 90 of a physical environment. A physical object 20 can be located within the environment, for example outside the field of view 90. While only one physical object 20 is illustrated in FIG. 3, it will be understood that any number of physical objects 20 can be captured within the field of view 90.

The head-mountable device 100 can perform object recognition with respect to the physical object 20. For example, a sensor other than the primary camera of the head-mountable device can detect, measure, and/or analyze the object 20 to determine a characteristic thereof. Object recognition can be facilitated by a proximity sensor, a depth sensor, and/or another camera of the head-mountable device 100. Additionally or alternatively, object recognition can be facilitated by one or more other devices. For example, the head-mountable device 100 can be in communication with another device that performs object recognition and communicates results to the head-mountable device 100. It will be understood that a wide variety of physical objects 20 can be recognized, including items, devices, people, buildings, geographic features, locations, and the like. A characteristic of the physical object 20 can include an identity, name, type, reference, color, size, shape, distance, position, velocity, acceleration, make, model, or other feature detectable by the head-mountable device 100.

As shown in FIG. 7, a head-mountable device can provide a user interface to prompt and/or warn a user regarding an environment. FIG. 7 illustrates a rear view of a head-mountable device operable by a user, the head-mountable device providing a user interface, according to some embodiments of the present disclosure. The optical assembly 200 can provide a user interface with an inner image 210 provided by a display 250 and an outer image 220 provided by a light track 270 surrounding the display 250. Not all of the depicted graphical elements may be used in all implementations, however, and one or more implementations may include additional or different graphical elements than those shown in the figure. Variations in the arrangement and type of the graphical elements may be made without departing from the spirit or scope of the claims as set forth herein. Additional components, different components, or fewer components may be provided.

As shown in FIG. 7, the optical assembly 200 can provide an output the combines the outputs of the display 250 and the light track 270. For example, within a single continuous image, which is within the user's field of view, can include an inner image 210 from the display 250 (e.g., showing a view 90 captured by a camera of the head-mountable device 100) and an outer image 220 from the light track 270. Where the outer image 220 includes an indicator 222, the indicator 222 can optionally occupy less than an entirety of a region surrounding the inner image 210. For example, the indicator 222 can be on a side of the inner image 210 that corresponds to a direction of interest. By further example, where the indicator 222 is provided to notify the user of an object outside of the user's field of view 90, the indicator 222 can be provided on a side of the inner image 210 that is in a direction of the object. As such, the user can be informed of such objects without and/or prior to seeing the objects.

In some embodiments, the indicator 222 can be output based on detection of a physical object 20 and/or one or more other characteristics of the physical object 20, such as distance from the user, velocity, acceleration, and/or other information. By further example, the indicator 222 can be output upon detection that the physical object when it is within a threshold distance from the user. The indicator 222 can allow a user to recognize the presence and/or other characteristics of the physical object 20 so that the user can react accordingly. While the use of indicator 222 is described herein with respect to a physical object 20, it will be understood that the indicator 222 can be output based on one or more of a variety of detected conditions with respect to a virtual object. For example, the indicator 222 can be provided to inform the user of virtual objects that do not necessarily have corresponding physical objects in an external environment of the user. By further example, the indicator 222 can be provided as the user approaches and intangible boundary that defines a space within which the user is to remain. Indicators 222 can be output in a manner that is based on the corresponding detections. For example, the color, intensity, flashing, duration, and/or other characteristics of the indicator 222 can be based on detected characteristics (e.g., proximity, etc.) and updated accordingly. Where separate indicators 222 are output sequentially (e.g., flashing), the number of indicators 222, time between indicators 222, duration of each indicator 222, and/or variations thereof can be provided based on detected characteristics (e.g., proximity, etc.) and updated accordingly.

In some embodiments, the indicator 222 can be output in the outer image 220 by the light track 270. For example, the indicator 222 can be output without modifying the inner image provided by the display 250. Accordingly, the light track 270 can be operated independently of the display 250. Where the light track 270 has a lower pixel density and/or count and has a lower power consumption than the display 250, such independent operation can be performed to reduce overall processing and power needs as compared to system in which the display is modified.

In some embodiments, a head-mountable device 100 can further provide sound or other audio or acoustic output to a user to enhance a user's awareness of physical and/or virtual objects. For example, the head-mountable device 100 can operate a speaker thereof or a speaker of another device to output sound to the user. The sound can be emitted based on one or more of a variety of detected conditions with respect to an object 20.

In some embodiments, a head-mountable device 100 can further provide haptic feedback to a user to enhance a user's awareness of physical and/or virtual objects. For example, the head-mountable device 100 can include a haptic feedback device and/or communicate with one or more external devices (e.g., worn by the user) that include haptic feedback components. The haptic feedback can be provided based on one or more of a variety of detected conditions with respect to an object 20.

Figure 8:
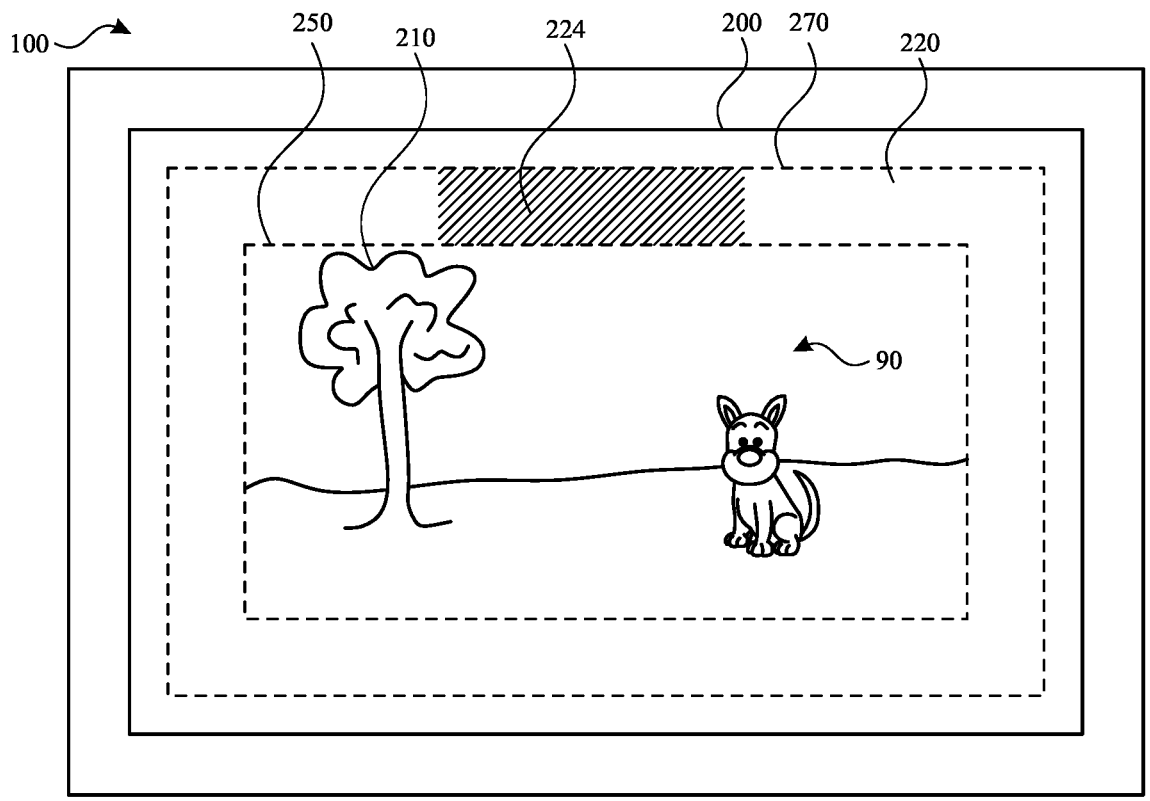
FIG. 8 illustrates a view of a head-mountable device providing a user interface with an optical assembly, according to some embodiments of the present disclosure.

Referring now to FIG. 8, a visual output provided by an optical assembly of a head-mountable device can provide other types of information to the user without interfering with operation of a central display.

As shown in FIG. 8, the light track 270 is operable to output an outer image 220 including an indicator 224. The indicator 224 can occupy some or all of a region surrounding the inner image 210. The indicator 224 can be output to notify the user of particular information. For example, the indicator 224 can be provided as a notification to the user regarding a status, event, and/or operation of the head-mountable device. By further example, the indicator 224 can be provided when a message is received, when batteries of the head-mountable device are low, when a reminder and/or an alarm is due, and the like. It will be understood that the light track 270 may be configured to provide a lower pixel count and/or density, such that the information provided may optionally be general in nature, rather than specific information (e.g., text or other content). Despite being general in nature, the indicator 224 can nonetheless inform the user regarding particular information without interfering with the operation of the display 250 and the inner image 210 output thereby. By further example, the indicator 224 can be provided when an input is received from the user, such as such touch, voice, dictation, gestures, and the like. The indicator 224 can be provided while such input is being received and/or as confirmation to the user that the input has been received. By further example, the indicator 224 can be provided as an indication of an activity of the head-mountable device, such as an active operation for health and/or activity tracking. By further example, the indicator 224 can be provided as an indication of an activity prior to and/or after its completion.

One or more characteristics of the output relating to the indicator 224 can distinguish between different types of information to be conveyed to the user. For example, the color, intensity, flashing, duration, and/or other characteristics of the indicator 224 can be based on the information to be conveyed, where distinct information is associated with at least one distinct characteristic.

In some embodiments, the indicator 224 can be output in the outer image 220 by the light track 270. For example, the indicator 224 can be output without modifying the inner image provided by the display 250, as described herein. Alternatively, the inner image 210 provided by the display 250 can provide information that is related to the indicator 224. For example, the inner image 210 can provide additional details associated with the purpose of the indicator 224 before, during, and/or after output of the indicator 224.

In some embodiments, a head-mountable device 100 can further provide sound or other audio or acoustic output corresponding to the output of the indicator 224. In some embodiments, a head-mountable device 100 can further provide haptic feedback corresponding to the output of the indicator 224.

Figure 9:
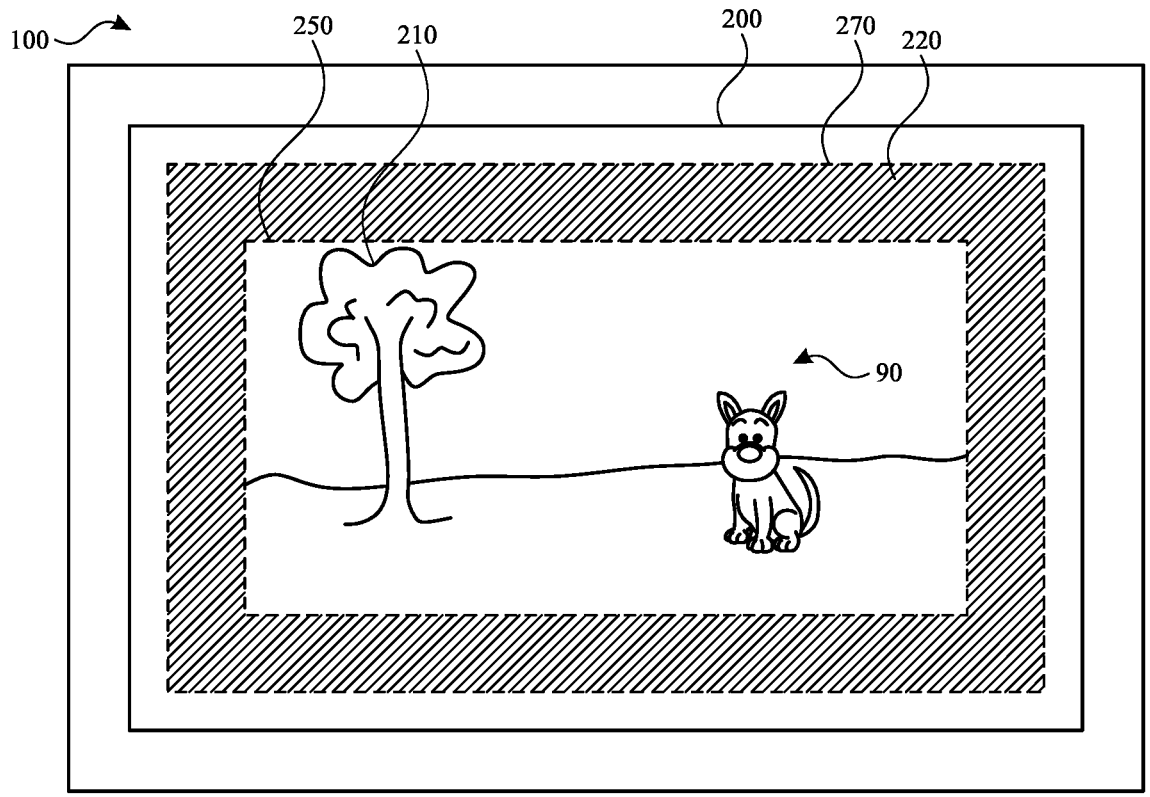
FIG. 9 illustrates a view of a head-mountable device providing a user interface with an optical assembly, according to some embodiments of the present disclosure.

Referring now to FIG. 9, a visual output provided by an optical assembly of a head-mountable device can include an outer image that supplements an inner image. As shown in FIG. 9, the light track 270 is operable to output an outer image 220 that can occupy some or all of a region surrounding the inner image 210. The outer image 220 can correspond to the inner image 210 by having one or more characteristics in common. For example, while the light track 270 can have a lower pixel count and/or density, they can output a range of colors that overlaps with the range provided by the display 250. As such, the light track 270 can be operable to output an outer image 220 that has, for example, a color and/or intensity in common with a color and/or intensity output by the display 250 at the inner image 210. In particular, a given portion of the outer image 220 can have a color and/or intensity that is the same and/or similar to a color and/or intensity of an adjacent portion of the inner image 210. Likewise, a different portion of the outer image 220 can have a color and/or intensity that is the same and/or similar to a color and/or intensity of a correspondingly adjacent portion of the inner image 210. As such, the outer image 220 can act as an extension of the inner image 210 to produce a single continuous image for the user.

It will be understood that the different embodiments described herein can be provided by the same head-mountable device. For example, a light track 270 can be operated in one mode to act as an extension of the display 250, as illustrated in FIG. 9. Such a mode of operation can be interrupted to enter a different mode, such as a warning as illustrated in FIG. 7 and/or other notification as illustrated in FIG. 8. Additionally or alternatively, different modes can be provided simultaneously (e.g., overlaid at the same location and/or at different locations) and/or in sequence.

Figure 10:
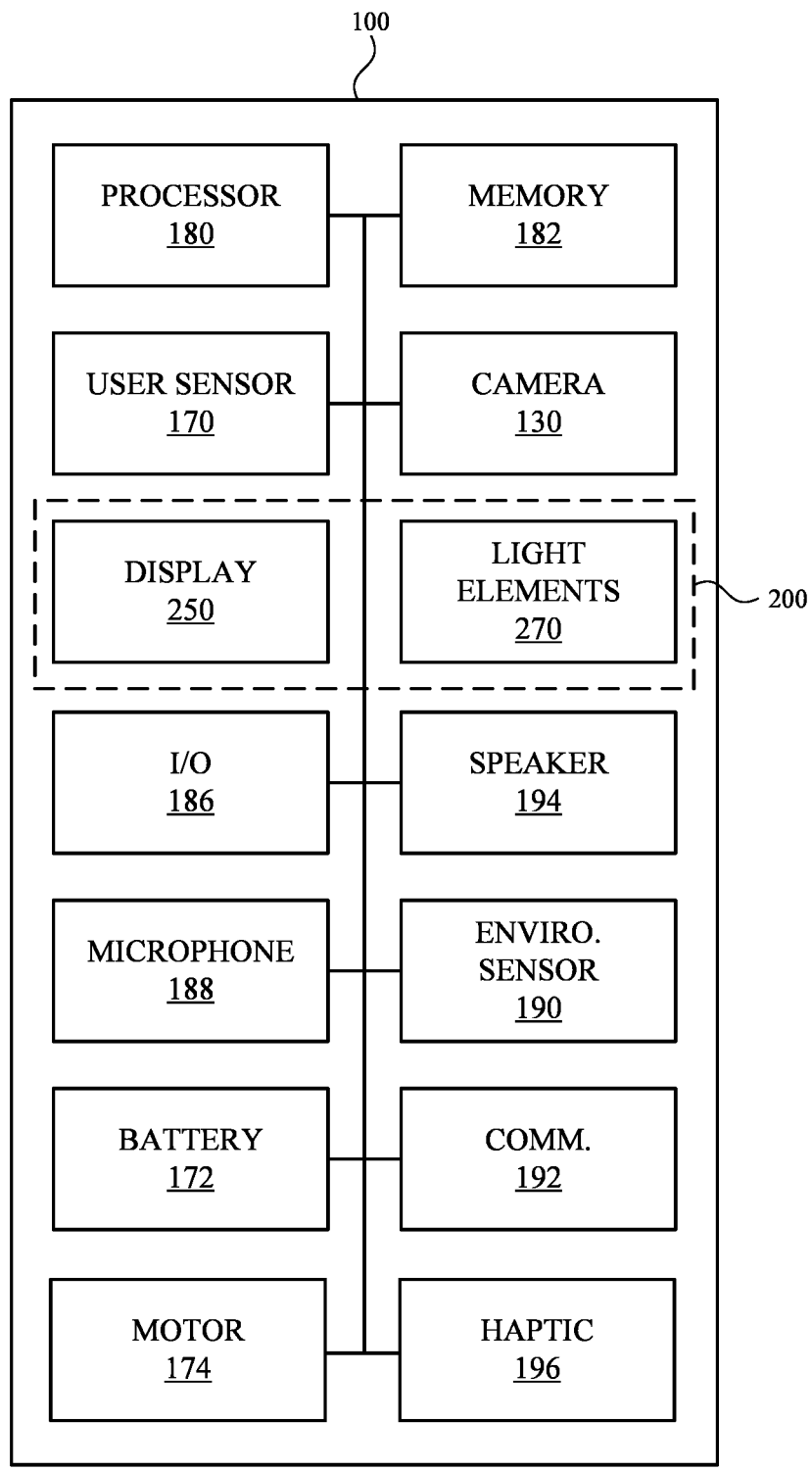
FIG. 10 illustrates a block diagram of a head-mountable device, in accordance with some embodiments of the present disclosure.

Referring now to FIG. 10, components of the head-mountable device can be operably connected to provide the performance described herein. FIG. 10 shows a simplified block diagram of an illustrative head-mountable device 100 in accordance with one embodiment of the invention. It will be understood that additional components, different components, or fewer components than those illustrated may be utilized within the scope of the subject disclosure.

As shown in FIG. 10, the head-mountable device 100 can include a processor 180 (e.g., control circuity) with one or more processing units that include or are configured to access a memory 182 having instructions stored thereon. The instructions or computer programs may be configured to perform one or more of the operations or functions described with respect to the head-mountable device 100. The processor 180 can be implemented as any electronic device capable of processing, receiving, or transmitting data or instructions. For example, the processor 180 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements. The processor can be a component of and/or operably connected to the control board and/or another component of the head-mountable device.

The memory 182 can store electronic data that can be used by the head-mountable device 100. For example, the memory 182 can store electrical data or content such as, for example, audio and video files, documents and applications, device settings and user preferences, timing and control signals or data for the various modules, data structures or databases, and so on. The memory 182 can be configured as any type of memory. By way of example only, the memory 182 can be implemented as random access memory, read-only memory, Flash memory, removable memory, or other types of storage elements, or combinations of such devices.

The head-mountable device 100 can include one or more sensors 170, such as user sensors configured to detect a condition relating to the user, as described herein.

The head-mountable device 100 can include one or more optical assemblies 200, each including a display 250 and a light track 270 having, for example, light emitters.

The head-mountable device 100 can include an input/output component 186, which can include any suitable component for connecting head-mountable device 100 to other devices. Suitable components can include, for example, audio/video jacks, data connectors, or any additional or alternative input/output components. The input/output component 186 can include buttons, keys, or another feature that can act as a keyboard for operation by the user.

The head-mountable device 100 can include the microphone 188 as described herein. The microphone 188 can be operably connected to the processor 180 for detection of sound levels and communication of detections for further processing, as described further herein.

The head-mountable device 100 can include the speakers 194 as described herein. The speakers 194 can be operably connected to the processor 180 for control of speaker output, including sound levels, as described further herein.

The head-mountable device 100 can include communications circuitry 192 for communicating with one or more servers or other devices using any suitable communications protocol. For example, communications circuitry 192 can support Wi-Fi (e.g., a 802.11 protocol), Ethernet, Bluetooth, high frequency systems (e.g., 900 MHZ, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 192 can also include an antenna for transmitting and receiving electromagnetic signals.

The head-mountable device 100 can include a battery 172, which can charge and/or power components of the head-mountable device 100.

The head-mountable device 100 can include adjustment control components described herein, such as a motor 174, an actuator, and the like for moving components (e.g., optical assemblies 200) to a desired relative position and/or orientation.

The head-mountable device 100 can include a haptic device 196 that provides haptic feedback with tactile sensations to the user. The haptic device 196 can be implemented as any suitable device configured to provide force feedback, vibratory feedback, tactile sensations, and the like. For example, in one embodiment, the haptic device 196 may be implemented as a linear actuator configured to provide a punctuated haptic feedback, such as a tap or a knock.

Accordingly, embodiments of the present disclosure provide a head-mountable device with optical assemblies for providing visual output to a user. The optical assemblies can include a central display as well as a light track that surrounds at least a portion of the central display. Primary information and images can be provided at the central display to be received at a center region of a user's vision. Supplemental content and/or information can be provided by operation of the light track, which can be operated with relatively simple controls. The supplemental content and/or information can be received at a peripheral region of the user's vision. Accordingly, the inner and outer images produced by the separate mechanisms of the optical assembly can provide a single continuous image for observation by the user.

Various examples of aspects of the disclosure are described below as clauses for convenience. These are provided as examples, and do not limit the subject technology.

Clause A: a head-mountable device comprising: a frame; and an optical assembly being moveable with respect to the frame, the optical assembly comprising: a display; and light emitters surrounding the display, wherein the optical assembly is operable to produce an image that includes both an output of the display and an output of the light emitters within a field of view.

Clause B: a head-mountable device comprising: a display; a sensor configured to detect an object in an environment external to the head-mountable device; light emitters surrounding the display; and a processor configured to operate at least one of the light emitters when the object is detected by the sensor.

Clause C: a head-mountable device comprising: a camera; a display operable to provide a first output based on a view captured by the camera; and light emitters surrounding the display, the light emitters being operable to provide a second output including a color based on at least one color of the output of the display, wherein the first output and the second output are provided to form a single continuous image.

One or more of the above clauses can include one or more of the features described below. It is noted that any of the following clauses may be combined in any combination with each other, and placed into a respective independent clause, e.g., clause A, B, or C.

Clause 1: a camera, wherein the output of the display comprises a view captured by the camera.

Clause 2: each of the light emitters are separated from corresponding adjacent one of the light emitters by a distance that is greater than a width of each of the light emitters.

Clause 3: the optical assembly further comprises: a barrel supporting the display and the light emitters; and a diffuser coupled to the barrel and covering each of the light emitters.

Clause 4: the optical assembly further comprises a light track supporting each of the light emitters and being coupled to the barrel.

Clause 5: a pixel density of the light emitters is lower than a pixel density of the display.

Clause 6: the light emitters are light emitting diodes.

Clause 7: the output of the light emitters includes a color that is based on at least one color of the output of the display.

Clause 8: the sensor comprises a proximity sensor.

Clause 9: the at least one of the light emitters is on a side of the display that corresponds to a location of the object.

Clause 10: a pixel density of the light emitters is lower than a pixel density of the display.

Clause 11: a speaker configured to output a sound when the object is detected by the sensor.

Clause 12: a haptic feedback device configured to output haptic feedback when the object is detected by the sensor.

Clause 13: the second output of one of the light emitters includes a color that is included in the output of a portion of the display that is adjacent to the one of the light emitters.

Clause 14: a pixel density of the light emitters is lower than a pixel density of the display.

Clause 15: the second output comprises light emitted from a continuous region entirely surrounding the display.

Clause 16: the light emitters are light emitting diodes.

As described herein, aspects of the present technology can include the gathering and use of data. The present disclosure contemplates that in some instances, gathered data can include personal information or other data that uniquely identifies or can be used to locate or contact a specific person. The present disclosure contemplates that the entities responsible for the collection, analysis, disclosure, transfer, storage, or other use of such personal information or other data will comply with well-established privacy practices and/or privacy policies. The present disclosure also contemplates embodiments in which users can selectively block the use of or access to personal information or other data (e.g., managed to minimize risks of unintentional or unauthorized access or use).

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
    a frame; and
    multiple optical assemblies, each respective optical assembly of the multiple optical assemblies being moveable with respect to the frame, each respective optical assembly of the multiple optical assemblies comprising:
        a display configured to produce a first output; and
        a light track extending continuously about a periphery of the display;
        light emitters distributed along the light track and surrounding the display, wherein each respective optical assembly is operable to produce an image within a field of view that includes both the first output of the display and a second output of the light emitters, the second output being separate from the first output.

2. The head-mountable device of claim 1, further comprising a camera, wherein the output of the display comprises a view captured by the camera.

3. The head-mountable device of claim 1, wherein each of the light emitters are separated from a corresponding adjacent one of the light emitters by a distance that is greater than a width of each of the light emitters.

4. The head-mountable device of claim 1, wherein the optical assembly further comprises:
    a barrel supporting the display and the light emitters; and
    a diffuser coupled to the barrel and covering each of the light emitters.

5. The head-mountable device of claim 4, wherein the light track is coupled to the barrel.

6. The head-mountable device of claim 1, wherein a pixel density of the light emitters is lower than a pixel density of the display.

7. The head-mountable device of claim 1, wherein the light emitters are light emitting diodes.

8. The head-mountable device of claim 1, wherein the output of the light emitters includes a color that is based on at least one color of the output of the display.

9. A head-mountable device comprising:
    a display configured to produce a first output;
    a sensor configured to detect an object in an environment external to the head-mountable device;
    a light track extending continuously about a periphery of the display;
    light emitters distributed along the light track and surrounding the display, the light emitters being configured to produce a second output separate from the first output; and
    a processor configured to operate at least one of the light emitters when the object is detected by the sensor.

10. The head-mountable device of claim 9, further comprising a camera, wherein an output of the display comprises a view captured by the camera.

11. The head-mountable device of claim 9, wherein the sensor comprises a proximity sensor.

12. The head-mountable device of claim 9, wherein the at least one of the light emitters is on a side of the display that corresponds to a location of the object.

13. The head-mountable device of claim 9, wherein a pixel density of the light emitters is lower than a pixel density of the display.

14. The head-mountable device of claim 9, further comprising a speaker configured to output a sound when the object is detected by the sensor.

15. The head-mountable device of claim 9, further comprising a haptic feedback device configured to output haptic feedback when the object is detected by the sensor.

16. A head-mountable device comprising:
    a camera;
    a display operable to provide a first output based on a view captured by the camera; and
    a light track extending continuously about a periphery of the display;
    light emitters distributed along the light track and surrounding the display, the light emitters being operable to provide a second output including a color based on at least one color of the output of the display, wherein the first output and the second output are provided to form a single continuous image, the second output being separate from the first output.

17. The head-mountable device of claim 16, wherein the second output of one of the light emitters includes a color that is included in the output of a portion of the display that is adjacent to the one of the light emitters.

18. The head-mountable device of claim 16, wherein a pixel density of the light emitters is lower than a pixel density of the display.

19. The head-mountable device of claim 16, wherein the second output comprises light emitted from a continuous region entirely surrounding the display.

20. The head-mountable device of claim 16, wherein the light emitters are light emitting diodes.

\* \* \* \* \*